US009957394B2

(12) United States Patent
Zhou et al.

(10) Patent No.: US 9,957,394 B2
(45) Date of Patent: May 1, 2018

(54) METHODS FOR PREPARING POWDER COATING COMPOSITIONS

(71) Applicant: PPG Industries Ohio, Inc., Cleveland, OH (US)

(72) Inventors: Hongying Zhou, Allison Park, PA (US); Anthony Chasser, Allison Park, PA (US); Shanti Swarup, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days. days.

(21) Appl. No.: 15/258,268

(22) Filed: Sep. 7, 2016

(65) Prior Publication Data

US 2018/0066143 A1 Mar. 8, 2018

(51) Int. Cl.
*B32B 27/40* (2006.01)
*B02C 23/18* (2006.01)
*C08L 67/00* (2006.01)
*C08L 75/00* (2006.01)
*C08K 5/00* (2006.01)
*C09D 5/03* (2006.01)
*C09D 167/02* (2006.01)

(52) U.S. Cl.
CPC ............. *C09D 5/03* (2013.01); *C09D 167/02* (2013.01)

(58) Field of Classification Search
CPC ......... C08G 18/06; C08G 71/00; C08L 75/00; C08L 75/02; C08L 75/04; C08K 5/00; C09D 5/03; C09D 175/02; C09D 175/04; C09D 167/00; B32B 27/40; B32B 2250/02; Y10T 428/31551; Y10T 428/31591; Y10T 428/31605
USPC ........ 528/44, 48; 241/21, 22, 23; 428/423.1, 428/423.7, 425.1, 425.8, 425.9
See application file for complete search history.

(56) References Cited

U.S. PATENT DOCUMENTS

| 4,366,288 A | * | 12/1982 | Resz ................ C09D 123/0853 525/60 |
| 4,419,407 A | | 12/1983 | Piccirilli et al. |
| 5,207,954 A | * | 5/1993 | Lewis ...................... C08J 3/122 159/48.1 |
| 5,357,021 A | | 10/1994 | Tye et al. |
| 5,373,080 A | | 12/1994 | Imashiro et al. |
| 5,650,476 A | | 7/1997 | Amano et al. |
| 6,069,221 A | | 5/2000 | Chasser et al. |
| 6,111,017 A | | 8/2000 | Imashiro et al. |
| 6,184,311 B1 | | 2/2001 | O'Keeffe et al. |
| 7,439,316 B2 | | 10/2008 | Hesselmans et al. |
| 7,625,973 B2 | | 12/2009 | Ambrose et al. |
| 7,776,440 B2 | | 8/2010 | Kunita et al. |
| 8,192,840 B2 | | 6/2012 | Kunita et al. |
| 8,389,113 B2 | | 3/2013 | Ambrose et al. |
| 2002/0130302 A1 | * | 9/2002 | Yamaguchi ............. H01B 1/12 252/500 |
| 2004/0053056 A1 | | 3/2004 | Rardon et al. |
| 2004/0219367 A1 | | 11/2004 | Spyrou et al. |
| 2011/0217471 A1 | | 9/2011 | Schwendeman et al. |
| 2013/0122765 A1 | | 5/2013 | Ambrose et al. |

FOREIGN PATENT DOCUMENTS

| EP | 0767188 A1 | 4/1997 |
| EP | 0881243 A1 | 12/1998 |
| JP | 2002371248 A | 12/2002 |
| JP | 2004196954 A | 7/2004 |
| JP | 2008156517 A | 7/2008 |
| WO | 2011109386 A1 | 9/2011 |
| WO | 2017122171 A2 | 7/2017 |

OTHER PUBLICATIONS

Taylor et al., "The Application of Carbodiimide Chemistry to Coatings", American Chemical Society, 1997, pp. 137-163.
Tillet et al., "Chemical reactions of polymer crosslinking and post-crosslinking at room and medium temperature", Progress in Polymer Science, 2011, vol. 36, pp. 191-217.

* cited by examiner

*Primary Examiner* — Thao T Tran
(74) *Attorney, Agent, or Firm* — Julie W. Meder; The Webb Law Firm

(57) ABSTRACT

Disclosed is a method for preparing powder coating compositions. The method includes mixing in an aqueous medium a carboxylic acid functional polymer having a high glass transition temperature, with a polycarbodiimide having a high glass transition temperature, drying the mixture, and grinding the resulting solid particles to obtain a powder.

18 Claims, No Drawings

METHODS FOR PREPARING POWDER COATING COMPOSITIONS

FIELD OF THE INVENTION

The present invention is directed to a method for preparing powder coating compositions including a polycarbodiimide.

BACKGROUND INFORMATION

Powder coating compositions for use in industrial and automotive coating applications, such as coatings for metal substrates, are extremely desirable. Such coating compositions can eliminate the organic solvents used in liquid coating compositions. When a powder coating composition is thermally cured, little, if any, volatile material is given off to the surrounding environment. This is a significant advantage over liquid coatings in which an organic solvent is volatilized into the surrounding atmosphere when the coating is cured by heating.

Additionally, powder coating compositions, which can be prepared by mixing all of the components together in a single medium, are desirable from a formulation perspective. However, the preparation of powder coating compositions based on carbodiimide compounds and compounds containing carboxylic acid functional groups have been conventionally difficult because the crosslinking reaction tends to take place too rapidly, resulting in coating systems having short pot-life and that are not satisfactorily flowing.

As a result, it would be desirable to provide improved methods for preparing powder coating compositions based on carbodiimide compounds and compounds containing carboxylic acid functional groups.

SUMMARY OF THE INVENTION

The present invention is directed to a method for preparing powder coating compositions comprising: (a) mixing in an aqueous medium (i) a carboxylic acid functional polymer having a glass transition temperature of at least 50° C., with (ii) a polycarbodiimide having a glass transition temperature of at least 50° C.; (b) drying the mixture of (i) and (ii) to obtain solid particles; and (c) grinding the solid particles to obtain a powder.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "an" aqueous medium, "a" carboxylic acid functional polymer, "a" polycarbodiimide, and the like refer to one or more of any of these items.

As previously mentioned, the present invention is directed to a method for preparing powder coating compositions. The method generally comprises mixing in an aqueous medium a carboxylic acid functional polymer having a glass transition temperature of at least 50° C., with a polycarbodiimide having a glass transition temperature of at least 50° C. The mixture is then dried. Solid particles are obtained and are then ground to obtain a powder. In addition, the method for preparing the powder coating compositions provides stable formulations such that they have a relatively low melt viscosity which provides for good flow and excellent coating appearance.

As used herein, the term "aqueous medium" refers to a carrier fluid in which the components of the powder coating composition are mixed together. The carrier fluid primarily or principally comprises water. For example, the solvent or carrier fluid can be substantially 100 weight percent water, or can be 90 weight percent water and 10 weight percent cosolvent, or can be 80 weight percent water and 20 weight percent cosolvent, or can be 70 weight percent of water and 30 weight percent cosolvent, or can be 60 weight percent of water and 40 weight percent cosolvent, based on the total weight of the solvent or carrier fluid.

Further, the term "polymer" refers to oligomers and homopolymers (e.g., prepared from a single monomer species), copolymers (e.g., prepared from at least two monomer species), polymers prepared with more than two, such as three or more, monomer species, and graft polymers. The term "resin" is used interchangeably with "polymer."

Any suitable carboxylic acid functional polymer can be used in the method for preparing a powder coating composition according to the present invention. Examples include but are not limited to polyester polymers having carboxylic acid functional groups and acrylic polymers having carboxylic acid functional groups.

Non-limiting examples of suitable polyester polymers having carboxylic acid functional groups include polyester polymers based on a condensation reaction of aliphatic polyols, including cycloaliphatic polyols, with aliphatic and/or aromatic polycarboxylic acids and anhydrides. Examples of suitable aliphatic polyols include 1,2-ethanediol, 1,3-propanediol, 1,4-butanediol, 1,6-hexanediol, neopentyl glycol, cyclohexane dimethanol, trimethylol propane, and the like. Suitable polycarboxylic acids and anhydrides include succinic acid, adipic acid, azelaic acid, sebacic acid, terephthalic acid, isophthalic acid, tetrahydrophthalic acid, hexahydrophthalic acid, trimellitic acid and anhydrides of such acids. The polyol and the acid or anhydride are reacted together with an excess of acid over alcohol so as to form a polyester which has free carboxylic acid groups.

Non-limiting examples of suitable acrylic polymers having carboxylic acid functional groups include polymers, which can be formed by reacting a polymerizable alpha, beta-ethylenically unsaturated carboxylic acid with one or more polymerizable, unsaturated monomers. By "alpha, beta-ethylenically unsaturated carboxylic acid" it is meant a compound having a carboxylic group conjugated with an alkene. By "ethylenically unsaturated" it is meant to include a carbon-carbon double bond. Examples of carboxylic acid group-containing monomers which can be used are acrylic acid and methacrylic acid, as well as crotonic acid, itaconic acid, fumaric acid, maleic acid, citraconic acid and the like, and monoalkylesters of unsaturated dicarboxylic acids. Examples of other suitable monomers include vinyl aromatic compounds such as styrene, alkyl-substituted styrenes such as alpha-methylstyrene and halide-substituted styrene such as chlorostyrene. Other suitable polymerizable, ethylenically unsaturated monomers which can be used are esters of acrylic and methacrylic acid such as methacrylate, methyl (meth)acrylate, ethyl (meth)acrylate, butyl (meth)acrylate, 2-ethylhexyl (meth)acrylate. As used herein, "(meth)acrylate" and similar terms are intended to include both acrylate and the corresponding methacrylate. In addition to the aforementioned ethylenically unsaturated, copolymerizable monomers, nitriles, such as acrylonitrile, vinyl and vinylidene halides such as vinyl chloride and vinylidene fluoride, and vinyl esters such as vinyl acetate may be used.

The various materials used to form the carboxylic acid functional polymers of the present invention are selected such that the resultant material has a high glass transition temperature ($T_g$), that is, at least 50° C. or at least 55° C. and up to 100° C. or up to 90° C., such as in a range of from 50° C. to 100° C. or in a range of from 55° C. to 70° C. As used herein, the $T_g$, is a measure of the hardness and melt flow of a polymer and is determined by differential scanning calorimetry (rate of heating 10° C. per minute, $T_g$ taken at the first inflection point).

The carboxylic acid functional polymer used in the present invention is typically present in the form of solid particles, thus imparting suitable sphericity, particle size and particle size distribution for powder coating applications. Typical particle sizes range from 5 to 200 microns.

For example, the carboxylic acid functional polymer used in the present invention has a low melt viscosity. As used herein, a low melt viscosity polymer is a polymer having a melt viscosity of less than 300 poise at 200° C. As used herein, the melt viscosity is measured by a Cone and Plate Viscometer made by Research Equipment (London) Ltd. Reference may be made to ASTM D 4287.

Typically, the carboxylic acid functional polymer is present in the powder coating composition of the invention in an amount up to 97 weight percent, up to 90 weight percent, or up to 85 weight percent. The powder coating composition can comprise at least 20 weight percent, 35 weight percent, or 50 weight percent carboxylic acid functional polymer. The carboxyl functional polymer used to prepare the powder coating composition can also comprise a range such as from 20 to 97 weight percent, 35 to 90 weight percent, or 50 to 85 weight percent, the weight percentages based on the total weight of solids in the powder coating composition.

The carboxylic acid functional polymer used in the present invention can have a weight average molecular weight of at least 1,000 g/mol and a number average molecular weight of at least 500 g/mol, both as determined by gel permeation chromatography using a polystyrene standard. The carboxylic acid functional polymer used according to the present invention can have an acid value ranging from 5 mg KOH/g to 1,000 mg KOH/g, such as 10 mg KOH/g to 700 mg KOH/g, or 20 mg KOH/g to 100 mg KOH/g or any other combination of numbers within any of these ranges.

As used herein, the term "polycarbodiimide" refers to a polymer containing two or more units having the structure: —N═C═N—. As will be appreciated, polycarbodiimides can generally be prepared by a condensation reaction of a polyisocyanate in the presence of a suitable catalyst to form a polycarbodiimide intermediate having terminal NCO-functionalities and by terminating and/or chain extending the polycarbodiimide intermediate by the addition of one or more active hydrogen-containing compounds, such as an amine and/or a hydroxy-containing compound, as will be more fully described below.

Suitable polyisocyanates for use in the foregoing condensation reaction, include, without limitation, aliphatic, including cycloaliphatic, polyisocyanates. Such polyisocyanates can contain, for example, from 2 to 4, such as 2 isocyanate groups per molecule. Examples of suitable aliphatic and cycloaliphatic diisocyanates are methylene-bis(4-cyclohexylisocyanate), isophorone diisocyanate, 1,4-cyclohexyl diisocyanate, 1,3-bis(isocyanatomethyl)cyclohexane, meta-tetramethylxylene diisocyanate ("TMXDI"), and/or a mixture thereof. Substituted polyisocyanates can also be used in which the substituents are nitro, chloro, alkoxy and other groups that are not reactive with hydroxyl groups or active hydrogens and provided the substituents are not positioned to render the isocyanate group unreactive.

The polyisocyanate can be an NCO-containing adduct such as would be formed, for example, when an active hydrogen-containing compound is present before or during polycarbodiimide formation, as described below.

The foregoing polycarbodiimide polymers can be made by any of a variety of methods starting from a polycarbodiimide intermediate having terminal NCO-functionalities. Moreover, the polycarbodiimide polymers can be produced from a polycarbodiimide intermediate made with or without use of an active hydrogen-containing chain extender.

The active hydrogen-containing chain extender is a spacer linking polyisocyanates together or linking isocyanate functional polycarbodiimides together, depending upon when the active hydrogen compound is added. For example, the chain extender can be added before, during, or after formation of the polycarbodiimide intermediate having terminal NCO-functionalities.

Any suitable compound containing active hydrogens may be used as the chain extender, if a chain extender is employed. The term "active hydrogen atoms" refers to hydrogens which, because of their position in the molecule, display activity according to the Zerewitinoff test. Accordingly, active hydrogens include hydrogen atoms attached to oxygen, nitrogen, or sulfur, and thus useful compounds will include those having at least two hydroxyl, thiol, primary amine, and/or secondary amine groups (in any combination). For example, the active hydrogen-containing chain extender contains from 2 to 4 active hydrogens per molecule.

Examples of such compounds include alcohols, which include polyols, amines, which includes polyamines, amino-alcohols, and mercapto-terminated derivatives. The term "polyol" is meant to include low molecular weight materials having an average of two or more hydroxyl groups per molecule and excludes high molecular weight polyols including polyethoxy or polypropxy groups (e.g., polyethylene glycol). By "low molecular weight materials" it is meant compounds having molecular weights Mw ranging from 0 to 1000 g/mol, such as 10 to 500 g/mol or 20 to 300 g/mol or 30 to 200 g/mol, or 50 to 150 g/mol or any other combination of numbers within any of these ranges.

Suitable polyols include low molecular weight diols, triols and higher alcohols, and low molecular weight amide-containing polyols. The low molecular weight diols, triols and higher alcohols include cycloaliphatic polyols such as 1,2-cyclohexanediol and cyclohexane dimethanol, aliphatic polyols, particularly alkylene polyols containing from 2 to 18 carbon atoms. Examples include ethylene glycol, 1,4-butanediol, 1,6-hexanediol. Examples of triols and higher alcohols include trimethylol propane, glycerol and pentaerythritol. Such chain extended polycarbodiimides comprise urethane linkages.

As mentioned above, to prepare a polycarbodiimide, an isocyanate terminated polycarbodiimide intermediate is first formed by condensation reaction of a polyisocyanate, which may or may not have been previously chain extended by the reaction of a polyisyocanate with an active-hydrogen containing chain extender of the type previously described. The polyisocyanate is condensed with the elimination of carbon dioxide to form the isocyanate terminated polycarbodiimide.

The condensation reaction is typically conducted by taking the solution of a polyisocyanate and heating in the presence of suitable catalyst. Such reaction is described, for example by K. Wagner et al., Angew. Chem. Int. Ed. Engl., vol. 20, p. 819-830 (1981). Representative examples of suitable catalysts are described in e.g. U.S. Pat. No. 2,941,988, U.S. Pat. No. 3,862,989 and U.S. Pat. No. 3,896,251. Examples include 1-ethyl-3-phospholine, 1-ethyl-3-methyl-3-phospholine-1-oxide, 1-ethyl-3-methyl-3-phospholine-1-sulfide, 1-ethyl-3-methyl-phospholidine, 1-methylphospholen-1-oxide, 1-ethyl-3-methyl-phospholidine-1-oxide, 3-methyl-1-phenyl-3-phospholine-1-oxide and bicyclic terpene alkyl or hydrocarbyl aryl phosphine oxide or camphene phenyl phosphine oxide.

The particular amount of catalyst used will depend to a large extent on the reactivity of the catalyst itself and the polyisocyanate being used. A concentration range of 0.05-5 parts of catalyst per 100 parts of polyisocyanate is generally suitable.

The resulting polycarbodiimide, which may or may not be chain extended, has terminal isocyanate groups. The isocyanate terminated polycarbodiimide can then be further reacted or capped by reacting the terminal isocyanate groups with an active hydrogen-containing hydrophilic compound to impart hydrophilicity to the polycarbodiimide enabling it to be dispersed in water. Suitable active hydrogen-containing hydrophilic compounds include monofunctional active hydrogen containing hydrophilic compounds, such as any secondary amine functional compound. Suitable active hydrogen-containing hydrophilic compounds for capping the polycarbodiimide having terminal isocyanate functional groups include secondary amines containing 8 or more carbon atoms, including di-n-butylamine, diamylamine, dihexylamine, dioctylamine. As a result, the capped polycarbodiimide comprises urea linkages within terminal positions of the polycarbodiimide.

The various materials used to prepare the polycarbodiimide of the present invention, which may be chain extended and/or capped, are selected such that the resulting polycarbodiimide has a high $T_g$, that is, at least 50° C., such as in a range of from 50° C. to 100° C., such as in a range of from 55° C. to 70° C. For example, materials including cyclic polyisocyanate and/or cyclic polyol chain extenders can impart a high $T_g$ to the resulting polycarbodiimide.

The polycarbodiimide used in the present invention is typically in the form of solid particles with typical particle size ranging from 1 to 200 microns.

For example, the various materials used to prepare the polycarbodiimide of the present invention, which may be chain extended and/or capped, are selected such that the resulting polycarbodiimide has a low melt viscosity. For example, the melt viscosity of the polycarbodiimide of the present invention, which may be chain extended and/or capped, is approximately 30 poise at 200° C. as referenced by ASTM D 4287.

For example, the polycarbodiimide of the present invention, which may be chain extended and/or capped, can comprise at least 30%, such as from 30 to 90%, such as from 35 to 60%, by weight cyclic groups based on weight of the polycarbodiimide, thus imparting suitable $T_g$ and/or melt viscosity to the polycarbodiimide. In addition, the use of secondary amines having at least 8 carbon atoms to cap the polycarbodiimide of the present invention, can further impart suitable $T_g$ and/or melt viscosity to the polycarbodiimide.

Typically, the polycarbodiimide is present in the powder coating composition of the invention in an amount up to 80 weight percent, up to 75 weight percent, or up to 70 weight percent. The powder coating composition can comprise at least 3 weight percent, 5 weight percent, or 10 weight percent polycarbodiimide. The polycarbodiimide used to prepare the powder coating composition can also comprise a range such as from 3 to 80 weight percent, from 5 to 75 weight percent, or from 10 to 70 weight percent, said weight percentages based on the total weight of solids in the powder coating composition.

As indicated, the powder coating composition of the present invention is prepared by mixing in a aqueous medium a carboxylic acid functional polymer, such as a polyester polymer having carboxylic acid functional groups and/or an acrylic polymer having carboxylic acid functional groups, with a polycarbodiimide, such as a chain extended and/or capped polycarbodiimide, modified for hardness, melt flow, and/or hydrophilicity; drying the resulting mixture to obtain solid particles; and grinding the solid particles to obtain a powder. For example, this reaction is conducted with a molar ratio of carboxylic acid functional groups from the carboxylic acid functional polymer to carbodiimide groups from the polycarbodiimide from 0.5 to 1.5:1.

For example, the carboxylic acid functional polymer and the polycarbodiimide can be mixed in an aqueous medium by any means standard in the art, such as by using a Cowles mixer, a media mill, paddle blade, a rotor-stator mill.

The mixture can be dried according to any means known in the art. Suitable methods for drying are spray drying, tray drying, freeze drying, fluid bed drying, single and double drum drying, flash drying, swirl drying, rotovaporation, and evaporation techniques, the use of all of which will be familiar to those skilled in the art.

The dry mixture can then be ground to a desired particle size. Grinding can be accomplished by any means known in the art, such as through the use of an air-classifying mill, impact mill, ball mill, or other fracture-induced mechanisms. Medium particle sizes of 1 to 500 microns are often desired for certain applications, such as 5 to 400 microns or 10 to 100 microns or 15 to 50 microns.

The pH of the aqueous medium may be 9.0 or higher, such as from 9.0 to 14.0, in order to partially or wholly neutralize any acid functionality on the carboxylic acid functional polymer. The pH of the aqueous medium containing the mixture of carboxylic acid functional polymer and polycarbodiimide described above can be adjusted by adding one or more bases to the medium. Suitable bases include an alkali hydroxide such as lithium hydroxide, sodium hydroxide, and/or potassium hydroxide; ammonium hydroxide; a dialkylamine, such as diisopropylamine; a trialkylamine, such as trimethylamine; and/or a hydroxylamine, such as triethanolamine, dimethylethanolamine, methyldiethanolamine, diethylethanolamine. For example, a buffer solution can be added to the aqueous medium to prevent changes in the pH of the aqueous medium.

When preparing the powder coating compositions of the present invention, the aforementioned components can be combined with other optional materials such as a pigment system, anti-caking additives, and/or other additives known to one skilled in the art. Post additives that improve fluidization of the powder mass and/or improve the resistance to impact fusion may be incorporated into the final product before or after micronization.

The powder coating compositions of this invention can be applied to any suitable substrate, for example, packaging substrates, industrial substrates, or automotive substrates. Examples of suitable substrates include metal, coated metal, wood, plastics, paper, leather, cloth, composites (material made of two or more substances), and the like. Although the powder coating compositions prepared in accordance with this invention can be applied over any of the aforementioned substrates by any suitable means known to those skilled in the art, their properties make them especially useful for application over metal by electrostatic spraying. Specifically, the coating compositions of the present invention are especially useful for coating metal such as aluminum, steel, tin plated steel, electrogalvanized steel, zinc-aluminum coated steel, zinc-nickel coated steel, hot dipped galvanized steel, and electrodeposition primed versions of the above. If applied over such metal, the substrates are usually cleaned and/or chemically treated. The coating compositions of the present invention can be applied to such substrates by any of a variety of methods including electrostatic spraying, phosphating, dipping, sputtering, brushing, matte coating, and roll coating techniques.

Coating thickness will vary depending upon the application desired. The coatings of the present invention may be applied over substrates in a single sweep or in several passes to provide coating thicknesses ranging from 1 to 10 mils (25 to 250 microns) or 2 to 4 mils (50 to 100 microns). Other standard methods for coating application can also be employed.

The powder coating compositions of the present invention can be used alone, or in combination with one or more other compositions, such as a coating system having two or more layers. For example, the powder coating compositions of the present invention can comprise a colorant or not and can be used as a primer, basecoat, and/or top coat. For substrates coated with multiple coatings, one or more of those coatings can be coatings as described herein. The present coatings can also be used as a packaging "size" coating, wash coat, spray coat, end coat, and the like.

It will be appreciated that the powder coating compositions described herein can be either one component ("1K"), or multi-component compositions such as two component ("2K") or more. A 1K composition will be understood as referring to a composition wherein all the coating components are maintained in the same container after manufacture, during storage, etc. A 1K composition can be applied to a substrate and cured by any conventional means, such as by heating, forced air, and the like. The present powder coating compositions can also be multi-component, which will be understood as compositions in which various components are maintained separately until just prior to application. As noted above, the present powder coating compositions can be thermoplastic or thermosetting.

The powder coating composition can be a clearcoat. A clearcoat will be understood as a coating that is substantially transparent or translucent. A clearcoat can therefore have some degree of color, provided it does not make the clearcoat opaque or otherwise affect, to any significant degree, the ability to see the underlying substrate. The clearcoats of the present invention can be used, for example, in conjunction with a pigmented basecoat. The clearcoat can be formulated as is known in the coatings art.

The powder coating composition may also comprise a colorant, such as a pigmented basecoat used in conjunction with a clearcoat, or as a pigmented monocoat. Such coating layers are used in various industries to impart a decorative and/or protective finish. As used herein, "colorant" refers to any substance that imparts color and/or other opacity and/or other visual effect to the composition. A single colorant or a mixture of two or more colorants can be used in the coatings of the present invention. Example colorants include pigments (organic or inorganic), dyes and tints, such as those used in the paint industry and/or listed in the Dry Color Manufacturers Association (DCMA), as well as special effect compositions.

After application of the powder coating composition onto the desired substrate, the coatings are cured. As used herein, the term "cure" refers to a coating wherein any crosslinkable components of the composition are at least partially crosslinked. For example, the crosslink density of the crosslinkable components ranges from 5% to 100%, such as 35% to 85%, or, in some cases, 50% to 85% of complete crosslinking. One skilled in the art will understand that the crosslink density can be determined by a variety of methods, such as dynamic mechanical thermal analysis (DMTA) using a Polymer Laboratories MK III DMTA analyzer conducted under nitrogen. Curing is usually conducted by subjecting the coated substrate to elevated temperatures. Typically, the elevated temperatures employed range from 30° C. to 400° C. or from 50° C. to 200° C. Higher curing temperatures can correspondingly shorten curing times. The chosen curing process depends upon the nature of the substrate as well as the particular components used in formulating the coating compositions.

Alternatively, crosslink density may be determined indirectly via a solvent rubbing test in an MEK double rub test. Adequate crosslink density is achieved when a cured coating sample resists double rubs with methyl ethyl ketone (MEK) or other solvent by rubbing a cloth saturated with MEK back and forth ("double rub") using normal hand pressure until the coating is marred. The test is run for at least 100 double rubs or coating failure, whichever is first, to determine susceptibility of the coating to solvent rubbing, where a lack of susceptibility (no marring) is associated with adequate crosslink density.

The combination of these and other inherent properties of the powder coating compositions of the present invention make them useful for a wide variety of applications. For example, they are especially useful for coating metal used in the manufacture of automotive trim parts, consumer packaging, architectural panels, playground equipment, metal office furniture, vending machines and appliances.

The compositions of the present invention are also suitable for use as packaging coatings. The application of various pretreatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. Contact between the metal and a food or beverage, for example, can lead to corrosion of a metal container, which can then contaminate the food or beverage. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans. Certain coatings of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to popping, corrosion, blushing and/or blistering.

Accordingly, the present invention is further directed to a package coated at least in part with any of the coating compositions described above. A "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage container or bakeware in which a consumer might make and/or store food; such a container would only maintain the freshness or integrity of the food item for a relatively short period. A package according to the present invention can be made of metal or non-metal, for example, plastic or laminate, and be in any form. An example of a suitable package is a laminate tube. Another example of a suitable package is metal can. The term "metal can" includes any type of metal can, container or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The coating can be applied to the interior and/or the exterior of the package. For example, the coating can be rollcoated onto metal used to make a two-piece food can, a three-piece food can, can end stock and/or cap/closure stock. The coating is applied to a coil or sheet by roll coating; the coating is then cured by radiation and can ends are stamped out and fabricated into the finished product, i.e. can ends. The coating could also be applied as a rim coat to the bottom of the can; such application can be by roll coating. The rim coat functions to reduce friction for improved handling during the continued fabrication and/or processing of the can. The coating can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans.

The powder coating compositions prepared and used according to the present invention may be substantially free, may be essentially free and/or may be completely free of bisphenol A and epoxy compounds derived from bisphenol A ("BPA"), such as bisphenol A diglycidyl ether ("BADGE"). Such compounds are sometimes referred to as "BPA non intent" because BPA, including derivatives or residues thereof, are not intentionally added but may be present in trace amounts because of impurities or unavoidable contamination from the environment. The coating compositions can also be substantially free and may be essentially free and/or may be completely free of bisphenol F and epoxy compounds derived from bisphenol F, such as bisphenol F diglycidyl ether ("BFDGE"). The term "substantially free" as used in this context means the and/or coatings contain less than 1000 parts per million (ppm), "essentially free" means less than 100 ppm and "completely free" means less than 20 parts per billion (ppb) of any of the above mentioned compounds, derivatives or residues thereof.

The present method allows for preparation of a powder coating composition using a mixture of carboxylic acid functional polymer and polycarbodiimide that is stable in an aqueous medium, and without the need for extreme conditions and/or the addition of volatile organic compounds.

Illustrating the invention are the following examples that are not to be considered as limiting the invention to their details. All parts and percentages in the examples, as well as throughout the specification, are by weight unless otherwise indicated.

Example 1

A polycarbodiimide was prepared in powder form using the ingredients listed in Table 1.

TABLE 1

| Ingredients | Parts by weight |
|---|---|
| Charge 1 | |
| Desmodur W[1] | 328.0 |
| Phospholene oxide[2] | 3.3 |
| Charge 2 | |
| Methylisobutylketone | 170 |
| Charge 3 | |
| Dibutyl tin dilaurate | 0.05 |
| Charge 4 | |
| 1,4-Dimethanol cyclohexane[3] | 19.9 |
| Methylisobutylketone | 60 |
| Charge 5 | |
| Di-n-butylamine[4] | 31.8 |

[1]Desmodur W is methylene-bis-(4-cyclohexyldiisocyanate) available from Bayer Materials Science, LLC.
[2]Phospholene oxide is 1-methyl-1-oxo-phospholene available from Clariant Chemical.
[3]1,4-Dimethanol cyclohexane is available from Eastman Chemical.
[4]Di-n-butylamine is available from Sigma Aldrich.

Charge #1 was added to a 1-liter, 4-necked kettle equipped with a motor driven stainless steel stir blade, a water-cooled condenser, a nitrogen inlet, and a heating mantle with a thermometer connected through a temperature feedback control device. The contents of flask were heated to 160° C. and held at that temperature until the isocyanate equivalent weight was determined to be over 516 eq/g by titration using a 951 Titrino from Metrohm. The temperature was then decreased to 90° C. and charge #2 and charge #3 were added. Charge #4 was added over 20 minutes, and the reaction mixture was held at 90-100° C. until the NCO equivalent weight stalled at about 2185.4 eq/g. Charge #5 was added and the mixture was held at 90-100° C. until IR spectroscopy showed the absence of the characteristic NCO band. After completion of the reaction, the reaction mixture was concentrated by evaporation under vacuum to remove solvent. The residual liquid was poured out onto aluminum foil and formed a solid at room temperature. The Tg of this resin was determined by differential scanning colorimetry to be 57° C. This material was then ground on an ACM (Hosakawa Air Classifying Mill) to a median D50 particle size of 100 microns.

Example 2

A coating composition was prepared using the ingredients and amounts (in grams) listed in Table 2. The ingredients were Cowles mixed in a standard water and solvent borne mixing procedure. The mixture was then air dried, and the resulting solid particles were ground to obtain a powder coating with a particle size range between 5 and 70 microns with an average particle size of approximately 40 microns.

TABLE 2

| Ingredients | Weight (g) |
|---|---|
| Product of Example 1 | 3.4 |
| Carboxylic acid functional polymer[5] | 10 |
| Total | 13.4 |

[5]Carboxylic acid functional polyester based on terephthalic acid having an acid number (AV) of 55 available from Hitachi Chemical (Mw of about 5000) and a Tg value of 60° C.

The coating composition of Example 2 was spray applied on a metal phosphate cold rolled steel panel and cured at 100° C. MEK double rubs were measured after 24 hours at room temperature. The cured coating composition withstood over 200 rubs without marring.

The present invention is also directed to the following clauses.

Clause 1: A method for preparing a powder coating composition comprising: (a) mixing in an aqueous medium (i) a carboxylic acid functional polymer having a glass transition temperature of at least 50° C., with (ii) a polycarbodiimide having a glass transition temperature of at least 50° C.; (b) drying the mixture of (i) and (ii) to obtain solid particles; and (c) grinding the solid particles to obtain a powder.

Clause 2: The method of clause 1 in which the polycarbodiimide comprises urethane and/or urea linkages.

Clause 3: The method of any of clauses 1-3 in which the urea linkages are within terminal positions of the polycarbodiimide.

Clause 4: The method of any of clauses 1-3 in which the polycarbodiimide is prepared by reacting a polyisocyanate in the presence of a catalyst to form a polycarbodiimide and extending the polycarbodiimide by the addition of a cyclic diol during or after polycarbodiimide formation.

Clause 5: The method of clause 4 in which the cyclic diol is a cycloaliphatic diol.

Clause 6: The method of any of clauses 1-5 in which the polycarbodiimide is prepared from at least one cyclic diisocyanate.

Clause 7: The method of any of clauses 1-6 in which the polycarbodiimide comprises at least 30 percent by weight of cyclic groups based on weight of the polycarbodiimide.

Clause 8: The method of any of clauses 1-7 in which the polycarbodiimide is prepared from methylene-bis-(4-cyclohexylisocyanate), isophorone diisocyanate, tetramethylxylylene diisocyanate, and/or a mixture thereof.

Clause 9: The method of any of clauses 1-8 in which the carboxylic acid functional polymer comprises a polyester polymer, an acrylic polymer, and/or a mixture thereof.

Clause 10: The method of any of clauses 1-9 in which the carboxylic acid functional polymer is in the form of solid particles.

Clause 11: The method of any of clauses 1-10 in which the polycarbodiimide is in the form of solid particles.

Clause 12: The method of any of clauses 1-11 in which the calculated molar ratio of carboxylic acid functional groups from the carboxylic acid functional polymer of (i) to carbodiimide groups from the polycarbodiimide of (ii) is from 0.5 to 1.5:1.

Clause 13: The method of any of clauses 1-12 in which carboxylic acid functional polymer has a weight average molecular weight of at least 1000 g/mol.

Clause 14: The method of any of clauses 1-13 in which the pH of the aqueous medium is 9.0 or higher.

Clause 15: The method of any of clauses 1-14 in which the melt viscosity of the polycarbodiimide is less than 300 poise at 200° C.

Clause 16: The method of any of clauses 1-15 in which the melt viscosity of the carboxylic acid functional polymer is less than 300 poise at 200° C.

Clause 17: A coating composition prepared according to the method of any of clauses 1-16.

Clause 18: A substrate at least partially coated with the coating composition of clause 17.

Clause 19: The substrate of clause 18, wherein the coating composition is spray applied to at least a portion of the substrate.

Clause 20: The substrate of clause 19, wherein the substrate comprises metal, wood, plastic, and/or composites.

Clause 21: The substrate of clauses 19 or 20, wherein the substrate is a package.

It will be appreciated by those skilled in the art that changes could be made to the method described above without departing from the broad inventive concept thereof. It is understood, therefore, that this invention is not limited to the particular method disclosed, but it is intended to cover modifications which are within the spirit and scope of the invention, as defined by the appended claims.

We claim:

1. A method for preparing a powder coating composition comprising:
   a) mixing in an aqueous medium
      (i) a carboxylic acid functional polymer having a glass transition temperature of at least 50° C., with
      (ii) a polycarbodiimide, having urethane and/or urea linkages and having a glass transition temperature of at least 50° C., wherein the polycarbodiimide is prepared by reacting a polyisocyanate in the presence of a catalyst to form a polycarbodiimide and extending the polycarbodiimide by the addition of a cyclic diol during or after polycarbodiimide formation;
   b) drying the mixture of (i) and (ii) to obtain solid particles; and
   c) grinding the solid particles to obtain a powder.

2. The method of claim 1 in which the urea linkages are within terminal positions of the polycarbodiimide.

3. The method of claim 1 in which the cyclic diol is a cycloaliphatic diol.

4. The method of claim 1 in which the polycarbodiimide is prepared from at least one cyclic diisocyanate.

5. The method of claim 1 in which the polycarbodiimide comprises at least 30 percent by weight of cyclic groups based on weight of the polycarbodiimide.

6. The method of claim 1 in which the polycarbodiimide is prepared from methylene-bis-(4-cyclohexylisocyanate), isophorone diisocyanate, tetramethylxylylene diisocyanate, and/or a mixture thereof.

7. The method of claim 1 in which the carboxylic acid functional polymer is in the form of solid particles.

8. The method of claim 1 in which the polycarbodiimide is in the form of solid particles.

9. The method of claim 1 in which the calculated molar ratio of carboxylic acid functional groups from the carboxylic acid functional polymer of (i) to carbodiimide groups from the polycarbodiimide of (ii) is from 0.5 to 1.5:1.

10. The method of claim 1 in which carboxylic acid functional polymer has a weight average molecular weight of at least 1000 g/mol.

11. The method of claim 1 in which the pH of the aqueous medium is 9.0 or higher.

12. The method of claim 1 in which the melt viscosity of the polycarbodiimide is less than 300 poise at 200° C.

13. The method of claim 1 in which the melt viscosity of the carboxylic acid functional polymer is less than 300 poise at 200° C.

14. A coating composition prepared according to the method of claim 1.

15. A substrate at least partially coated with the coating composition of claim 14.

16. The substrate of claim 15, wherein the coating composition is spray applied to at least a portion of the substrate.

17. The substrate of claim 16, wherein the substrate comprises metal, wood, plastic, and/or a composite.

18. The substrate of claim 15, wherein the substrate is a package.

* * * * *